US009163475B2

(12) United States Patent
Meinke et al.

(10) Patent No.: US 9,163,475 B2
(45) Date of Patent: Oct. 20, 2015

(54) CLOSING OF UNDERWATER OIL SPILLS WITH THE HELP OF MAGNETIC POWDERS

(76) Inventors: Rainer Meinke, Melbourne, FL (US); Mark Senti, Malabar, FL (US); Gerald Stelzer, Palm Bay, FL (US)

( * ) Notice: Subject to any disclaimer, the term of this patent is extended or adjusted under 35 U.S.C. 154(b) by 200 days.

(21) Appl. No.: 13/700,866

(22) PCT Filed: Jun. 1, 2011

(86) PCT No.: PCT/US2011/038767
§ 371 (c)(1),
(2), (4) Date: May 9, 2013

(87) PCT Pub. No.: WO2011/153245
PCT Pub. Date: Dec. 8, 2011

(65) Prior Publication Data
US 2013/0213512 A1 Aug. 22, 2013

Related U.S. Application Data

(60) Provisional application No. 61/350,445, filed on Jun. 1, 2010.

(51) Int. Cl.
| | |
|---|---|
| F16L 55/10 | (2006.01) |
| E21B 33/12 | (2006.01) |
| E21B 33/00 | (2006.01) |
| E21B 33/10 | (2006.01) |
| F16J 15/43 | (2006.01) |

(52) U.S. Cl.
CPC .................. *E21B 33/12* (2013.01); *E21B 33/00* (2013.01); *E21B 33/10* (2013.01); *F16J 15/43* (2013.01); *F16L 55/1003* (2013.01)

(58) Field of Classification Search
CPC ........ E21B 33/00; F16J 15/43; F16L 55/1003
USPC ..................... 138/89, 37, 42, 44, 97
See application file for complete search history.

(56) References Cited

U.S. PATENT DOCUMENTS

| | | | |
|---|---|---|---|
| 3,052,297 A | 9/1962 | Blydorb | |
| 3,323,773 A | 6/1967 | Walker | |
| 4,293,137 A * | 10/1981 | Ezekiel | 277/410 |
| 4,478,424 A * | 10/1984 | Raj | 277/302 |
| 4,604,229 A | 8/1986 | Raj et al. | |
| 4,671,679 A | 6/1987 | Heshmat | |

(Continued)

FOREIGN PATENT DOCUMENTS

WO    2008104469    9/2008

*Primary Examiner* — Patrick F Brinson
(74) *Attorney, Agent, or Firm* — Ferdinand Romano; Stephen C. Thomas

(57) ABSTRACT

A segment of a structure mitigates flow of fluid therethrough. In one embodiment the segment includes an opening for the fluid flow and the modified structure may include a ferromagnetic wall defining the opening and a plurality of permanently magnetized particles. Some of the permanently magnetized particles are attached to the wall by magnetic forces. A system is also provided for injecting magnetic particles into a cavity to impede movement of fluid through the cavity. A method is also described for mitigating a flow of fluid through an opening in a wall. In one embodiment, the method includes positioning a plurality of first magnetic particles along the wall and about the opening and attaching a plurality of second magnetic particles to the first magnetic particles wherein some of the second magnetic particles collectively extend across the opening to cover the opening.

24 Claims, 13 Drawing Sheets

(56) References Cited

U.S. PATENT DOCUMENTS

| | | | |
|---|---|---|---|
| 4,830,384 A * | 5/1989 | Raj et al. ........................ 277/410 |
| 5,287,148 A * | 2/1994 | Sakemi et al. ................ 399/104 |
| 6,857,635 B1 | 2/2005 | Li et al. |
| 7,428,922 B2 | 9/2008 | Fripp et al. |
| 2004/0084184 A1 | 5/2004 | Orban et al. |
| 2008/0110673 A1 | 5/2008 | Giroux et al. |

* cited by examiner

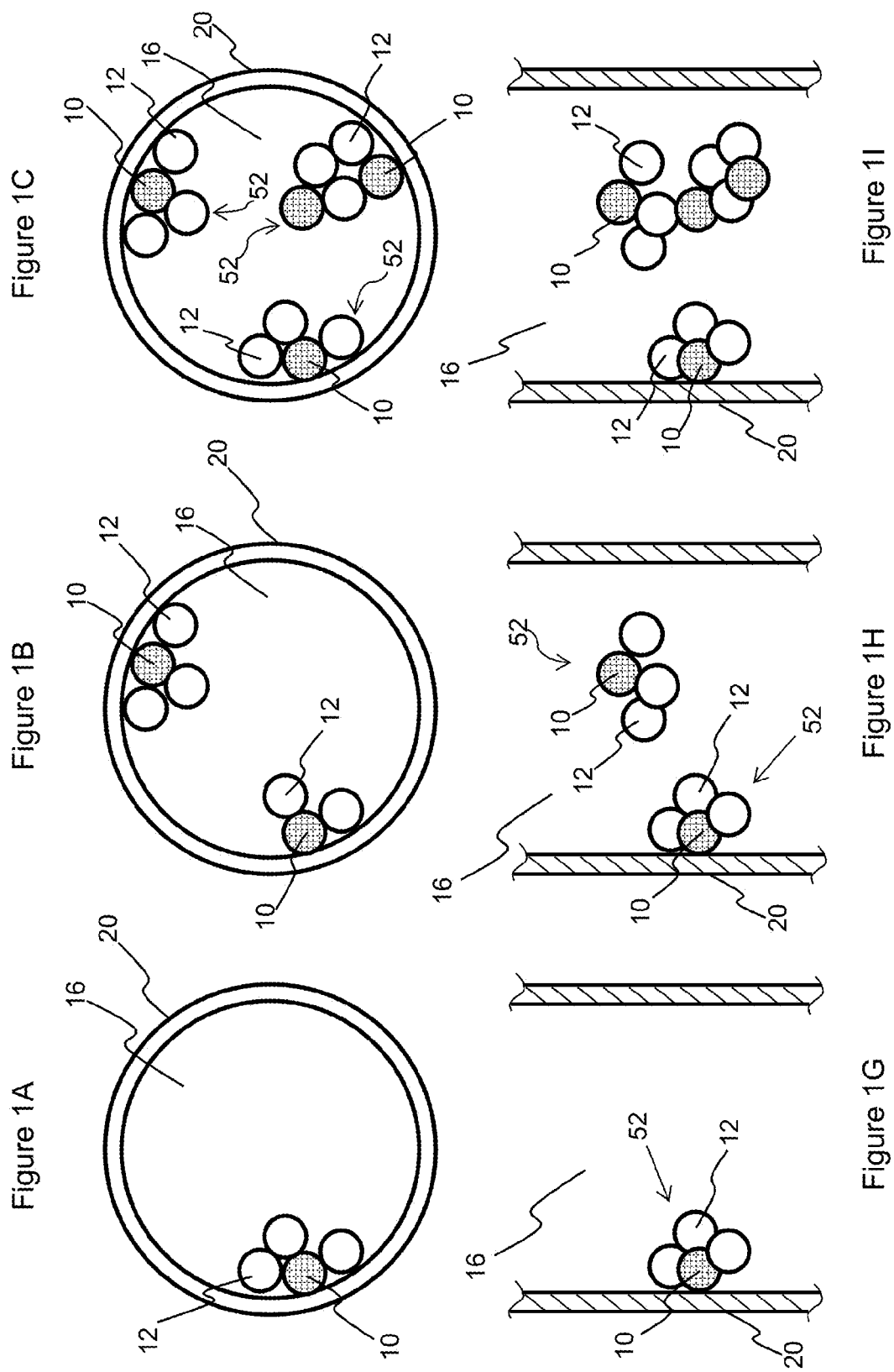

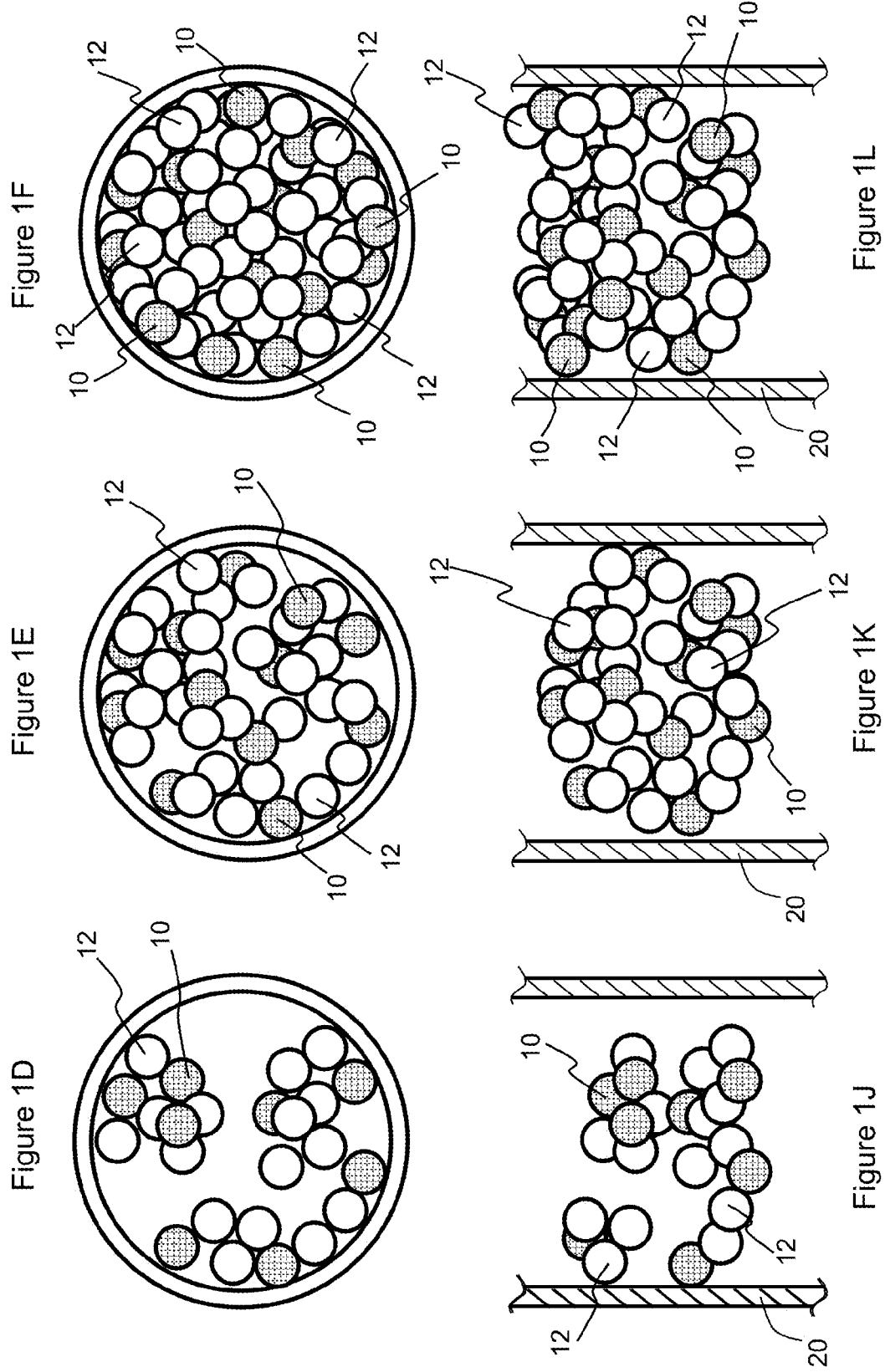

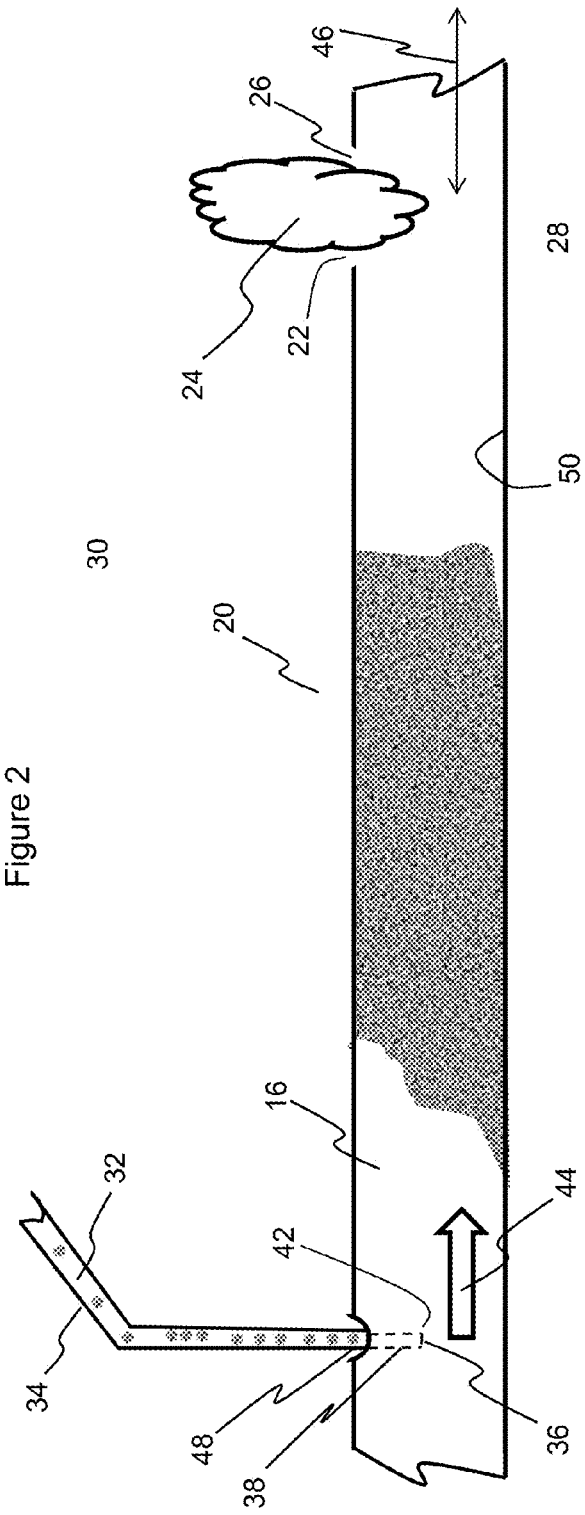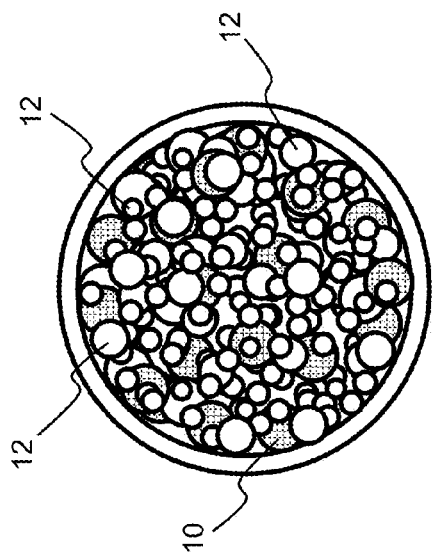

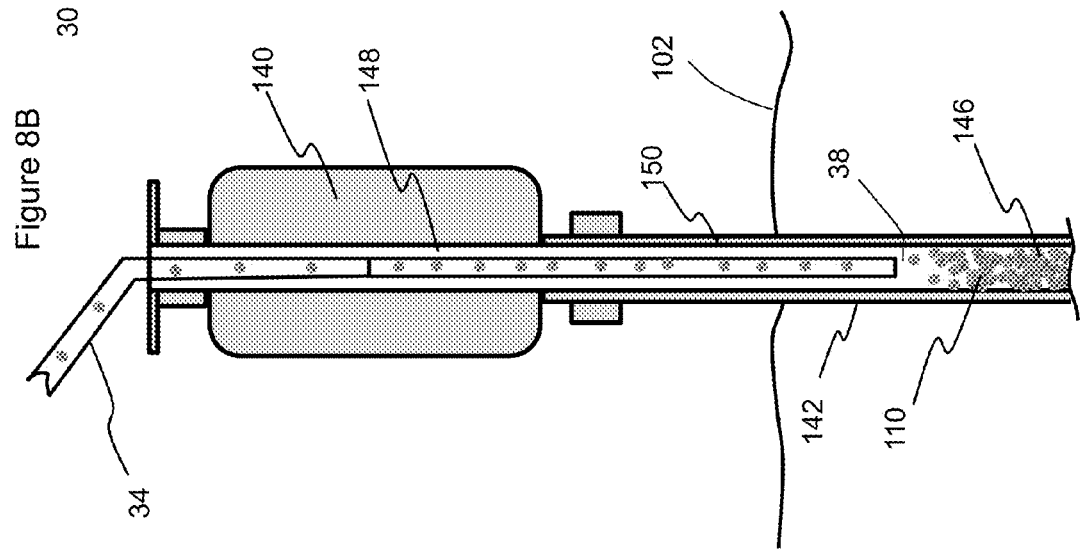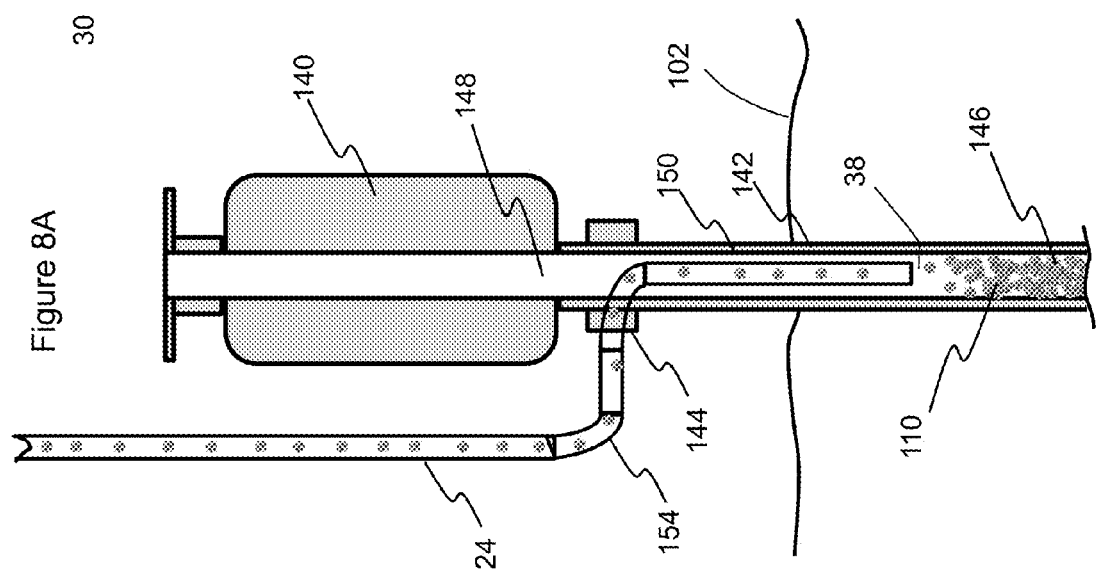

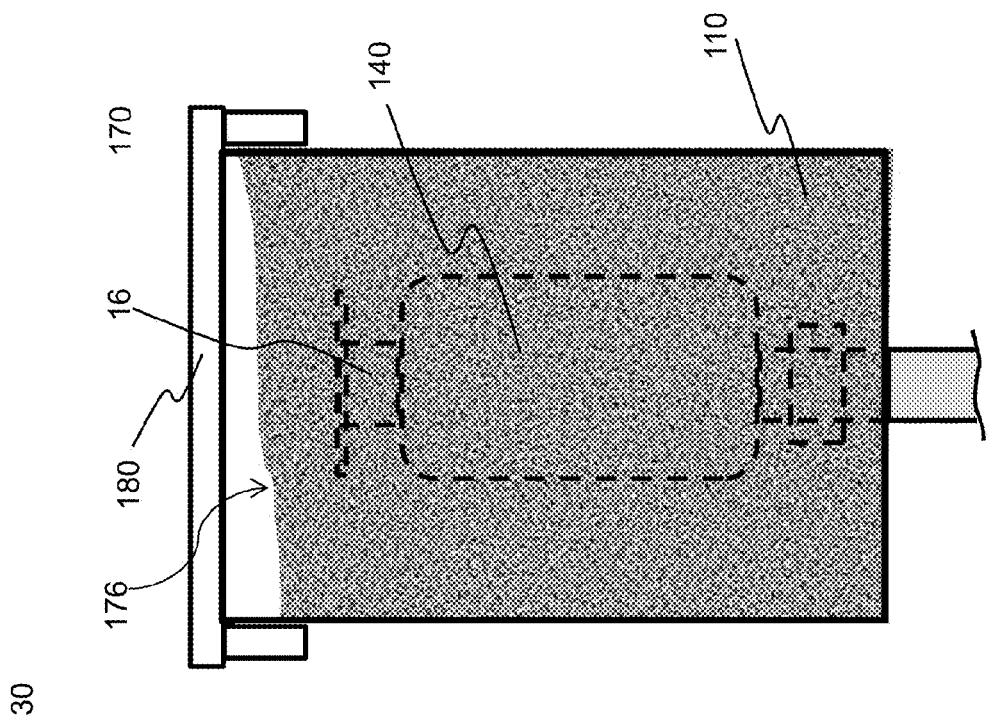
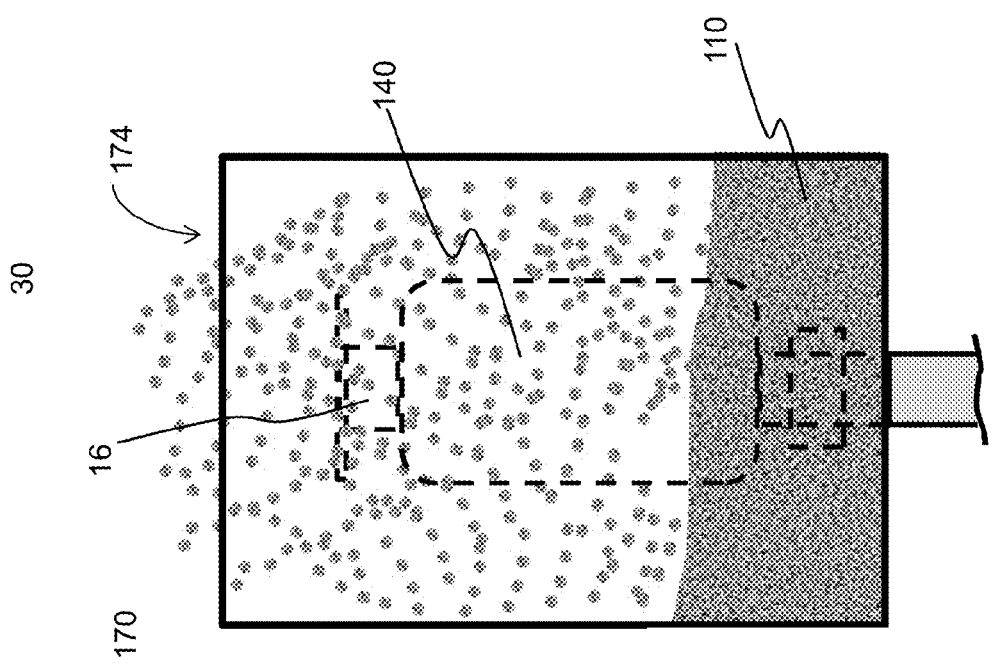

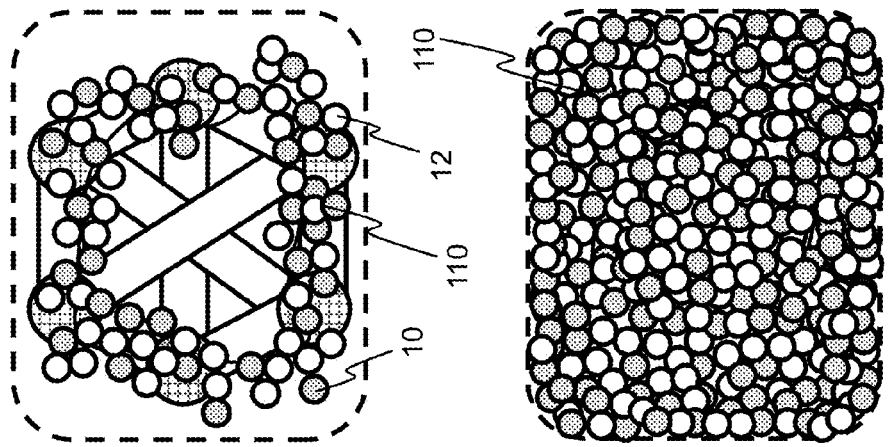
Figure 11C
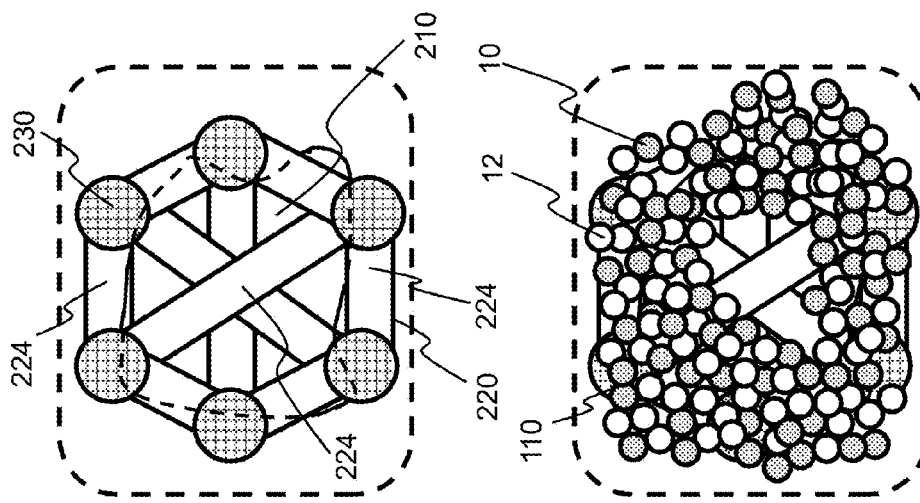
Figure 11B
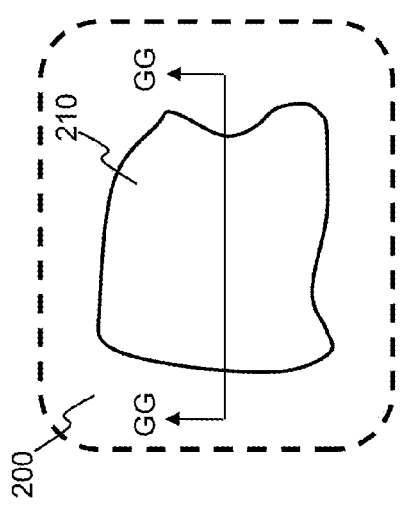
Figure 11A
Figure 11F
Figure 11E
Figure 11D

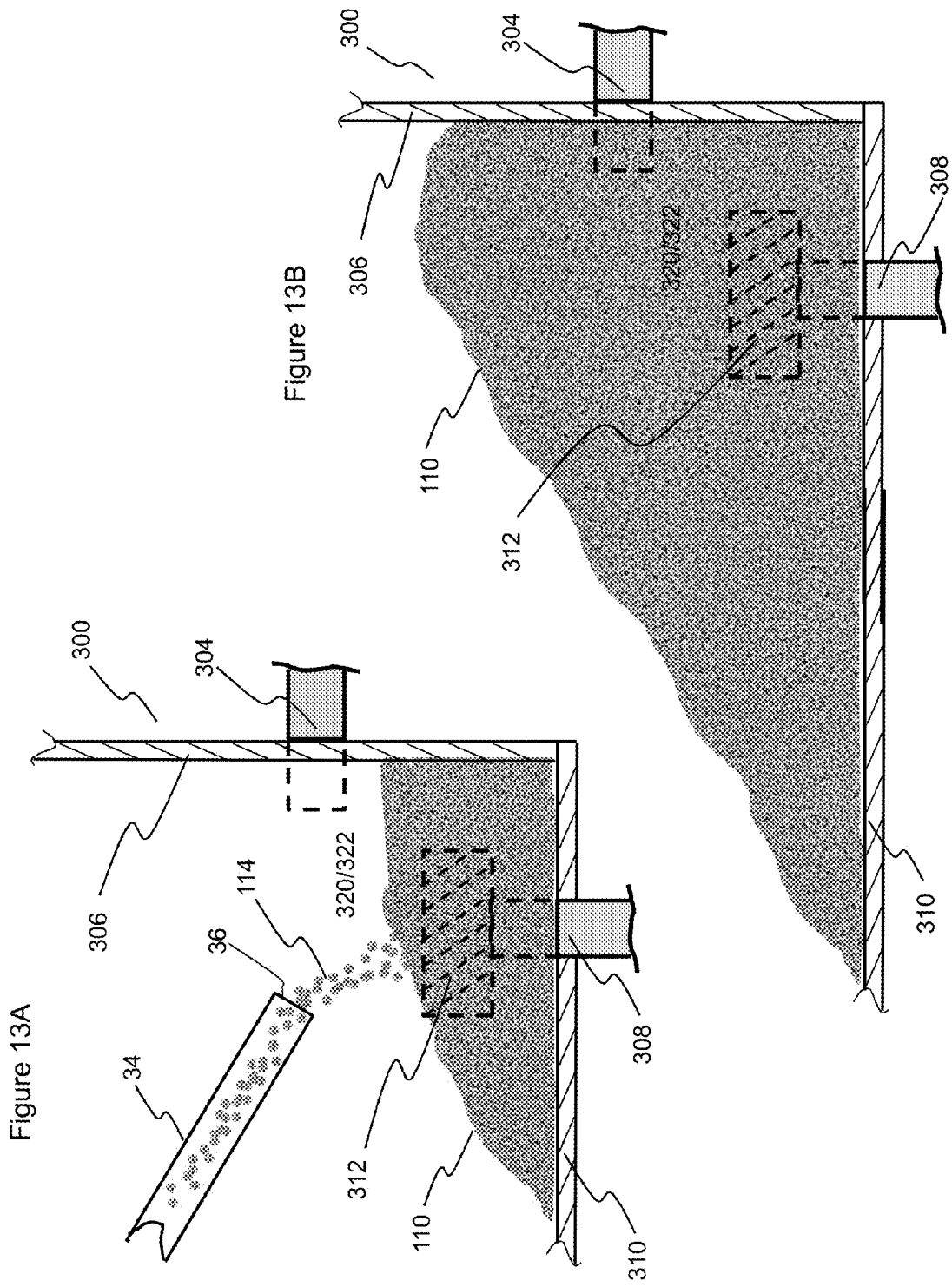

CLOSING OF UNDERWATER OIL SPILLS WITH THE HELP OF MAGNETIC POWDERS

PRIORITY BASED ON RELATED APPLICATION

This application claims priority from U.S. Provisional Application No. 61/350,445 filed Jun. 1, 2010 and International Application No. PCT/US2011/038767 filed on Jun. 1, 2011.

FIELD OF THE INVENTION

The present invention relates to systems and methods for mitigating uncontrolled flow of fluids, through walls, including walls of pipes and, more specifically, to insertion of magnetic materials in any flow path to limit or prevent flow of fluid through the path. In one series of embodiments the inventive concepts are applicable to mitigation of uncontrolled flow of oil or gas from a well bore, particularly in relation to underwater well heads.

BACKGROUND

It is imperative to prevent and mitigate oil well blowouts because they present great risk to human life and damage the environment. These and other types of spills pose large environmental clean-up costs and socio-economic upheaval. The problems are particularly acute when uncontrolled flow results from off-shore oil wells. It has been generally established in the petroleum industry that a series of large valve systems, termed a blowout preventer, should be positioned in-line with the wellhead to provide primary and secondary systems to stop the flow of oil under blowout conditions. Blowout preventers may be regarded as failsafe designs in a limited sense. That is, when one valve system fails to actuate as intended, one or more secondary valve systems are available as back-ups to reduce the risk that uncontrolled flow will continue unabated. This, of course, presumes that standard inspections and established procedures are followed and that the valves are properly maintained.

With occurrence of human fatalities and economic and environmental disasters, due to uncontrolled spills, additional solutions should be made available which quickly seal well bores and other flow paths in the event a blowout preventer malfunctions or when a spill occurs due to other causes. With respect to well bores, a number of conventional approaches are available to close the well when the blowout preventer malfunctions, these including use of a containment dome, connection of a riser insertion tube or injection of dense material into the blowout preventer followed by sealing the well with cement. As one example, it has at times been effective to counter the pressure at the well head to perform what is referred to as a top kill. In this procedure dense material is pumped down the drill string or through a secondary line which bypasses the blowout preventer. The resulting downward pressure can prevent upward movement of oil and gas. The foregoing solutions have, at times, been effective in particular contexts, but none of these have provided a universal solution to rapidly abate the toxic flow of petroleum products into bodies of water. Similarly when the wall of a tank or other reservoir, or the wall of a land or sea transport vessel is compromised, there is a need to quickly seal the wall in order to mitigate flow of petroleum products or toxic chemicals into the environment.

SUMMARY OF THE INVENTION

In the past, it has been proposed to close underwater oil spills by covering or filling the bore hole with dirt or small particles. The process is based on recognition that forces from the well head can, at least in part, be offset with the weight of material sent down an overlying pipeline under pressure. The effectiveness of such a process is seen to be limited. For example, particles used to cover a well head may easily be flushed away by the continued movement of petroleum through the well head with the resulting drag forces on the injected material. According to embodiments of the invention, a more effective procedure utilizes particles that experience strong forces of attraction, which forces cause the particles to stick or bond to one another and ferromagnetic materials of the oil well. In one series of embodiments, permanent magnets of varied sizes provide this feature. Such permanent magnets are produced from fine powders of various magnetic materials, including Alnico (an alloy of Al, Ni and Co) and neodymium-iron-boron (NdFeB), that are glued or sintered together and then magnetized. Generally, magnetic particles suitable for practicing the invention can be obtained in numerous well-known forms, with particle sizes varying from a fraction of a mm to small beads (e.g., spheres on the order of one mm in diameter) or substantially larger particles (e.g., spheres having diameters of several cm). By way of example, a large bucket containing such material can be magnetized so that the particles stick together with relatively strong magnetic forces, but are not necessarily form-stable. Depending on the field strengths, such magnetized powder or beads can behave like a fluid, e.g., having flow-like properties, with a very high viscosity and surface tension such that the material components do not flow apart (i.e., separate) when immersed in water or other liquids. These properties are a function of the field strengths exhibited by individual particles. A mixture of the particles may comprise permanent magnets and soft iron particles (where the term soft iron refers to materials that are easily magnetized and demagnetized and which have small hysteresis losses). The "pouring" of such magnetized powder or beads in or about a rupture or a bore hole of an oil well pipeline will form a sealing cover that is not easily washed away under the pressure of the escaping oil. Generally, crude oil gushing out of a well pipe imposes strong drag forces on materials that are injected into the flow. The drag forces are proportional to the area in cross section. In the case of spherical particles the drag forces are proportional to the particle radius squared. However, the weight of the spherical particles is proportional to the cube of the radius. Given these dependencies, particle sizes can be chosen for vertical wells that overcome the drag forces based on the force of gravity. Advantageously, the applied magnetic materials will stick to magnetic structures which are part of the well, e.g., a steel pipeline structure.

Accordingly, a solution is provided to close underwater oil spills or leaks based on application of magnetized particles that have a very strong attraction to one another and to other magnetic particles, without requiring a gluing sealing force, to form a tight bond. Such particles will not separate when immersed in salt water or other liquids. "Pouring" or injecting such magnetized material into the pipeline bore of a spilling oil well forms a seal or blockage that can counteract the drag forces of the flow. The magnetic particles stick to iron or other magnetic structures which are part of the well. In one set of embodiments, the magnetic particles comprise soft iron steel spheres and permanently magnetized spheres which strongly interact and bond together.

According to one embodiment of the invention, a segment of a structure is modified to mitigate a flow of a fluid therethrough. The segment includes an opening for the fluid flow and the modified structure includes a ferromagnetic wall defining the opening, a first plurality of permanently magnetized particles and a second plurality of magnetic particles. Some of the permanently magnetized particles are attached to the wall by magnetic forces and some of the magnetic particles of the second plurality are attached to the first plurality of permanently magnetized particles.

A system is also provided for injecting magnetic particles into a cavity to impede movement of fluid through the cavity. The system includes a transport tube having a major portion formed of non-magnetic material and having first and second opposing ends for receiving or emitting a carrier medium through the tube; a pump coupled to receive the carrier medium and transfer the carrier medium under pressure into the transport tube; control circuitry; and components configured to separately select particles of different types. The components operate under direction of the control circuitry to control the separate selection of the particles of different types and separately inject particles of different types into the transport tube in an alternating sequence according to the type of particle for passage of particles of at least two different types through the transport tube along with the carrier medium and for exit of the particles from the transport tube in accord with the alternating sequence.

A method according to the invention of mitigates a flow of fluid through a cavity in a structure about which there is positioned ferromagnetic material along which the fluid flows. The method includes attaching a first plurality of magnetic particles to the ferromagnetic material and to one another, and attaching a second plurality of particles to particles in the first plurality to fill a portion of the bore region with magnetic particles which impede the fluid flow.

In another method according to the invention, a flow of fluid through an opening in a wall is mitigated by positioning a plurality of first magnetic particles along the wall and about the opening and attaching a plurality of second magnetic particles to the first magnetic particles wherein some of the second magnetic particles collectively extend across the opening to cover the opening.

An oil well structure is also provided where the structure is positioned about a sea bed in a body of water. The structure includes a segment of pipe, connected to a well head, having an opening therein through which oil may exit from the pipe and into the body of water. The structure includes a blowout preventer comprising one or more valves and a plurality of magnetic particles positioned in or about the blow out preventer or in or about the segment of pipe to impede movement of the oil out of the oil well structure and into the body of water.

According to another embodiment, a method of mitigating a flow of fluid through a cavity in a structure includes the steps of inserting and open end of a transport tube in an opening 16 to a first location in or about the cavity, initiating pressurized flow of a carrier medium through the tube for injection into the structure, dispensing magnetized particles into the carrier medium for flow through the tube and injection into the structure, and dispensing multiple ferromagnetic particles into the carrier medium for flow through the tube and injection into the structure.

BRIEF DESCRIPTION OF THE DRAWINGS

FIGS. 1A-1F are a series of views taken along an axis of a symmetry of a pipe to illustrate sequential deposition of magnetic particles in the pipe to fill a bore region of the pipe according to the invention, while FIGS. 1G-1L are a series of views taken through the axis of a symmetry of the pipe shown in FIGS. 1A-1F to further illustrate stages in the sequential deposition of magnetic particles, wherein FIGS. 1A and 1G illustrate a first stage, FIGS. 1B and 1H illustrate a second stage, FIGS. 1C and 1I illustrate a third stage, FIGS. 1D and 1J illustrate a fourth stage, FIGS. 1E and 1K illustrate a fifth stage, and FIGS. 1F and 1L illustrate a sixth stage;

FIG. 2 illustrates a ruptured structure being sealed according to the invention;

FIG. 3 depicts an agglomeration of magnetized and magnetic particles of varied size securely attached to one another or an inner wall of the structure shown in FIG. 2;

FIGS. 8A and 8B illustrate top kill designs according to the invention for mitigation of an oil spill occurring above a blowout preventer;

FIGS. 9A and 9B illustrate another top kill design where a box structure is placed about a blowout preventer to receive magnetic material according to the invention;

FIG. 10G is a view of the same structure and opening 210 taken along line G-G of FIG. 10A, while

FIGS. 11A-11F are elevation views of a wall structure illustrating another sequence in a process for closing an opening with magnetic material.

FIGS. 13A and 13B are plan views illustrating application of the inventive concepts to a structure which normally contains a fluid or is surrounded by a fluid, where the structure includes an opening in a vertical wall 306 or an opening along a horizontal surface.

In accord with common practice, the various described features may not be drawn to scale, but are drawn to emphasize specific features relevant to the invention. Like reference characters denote like elements throughout the figures and text.

DETAILED DESCRIPTION OF THE INVENTION

Figure 4:
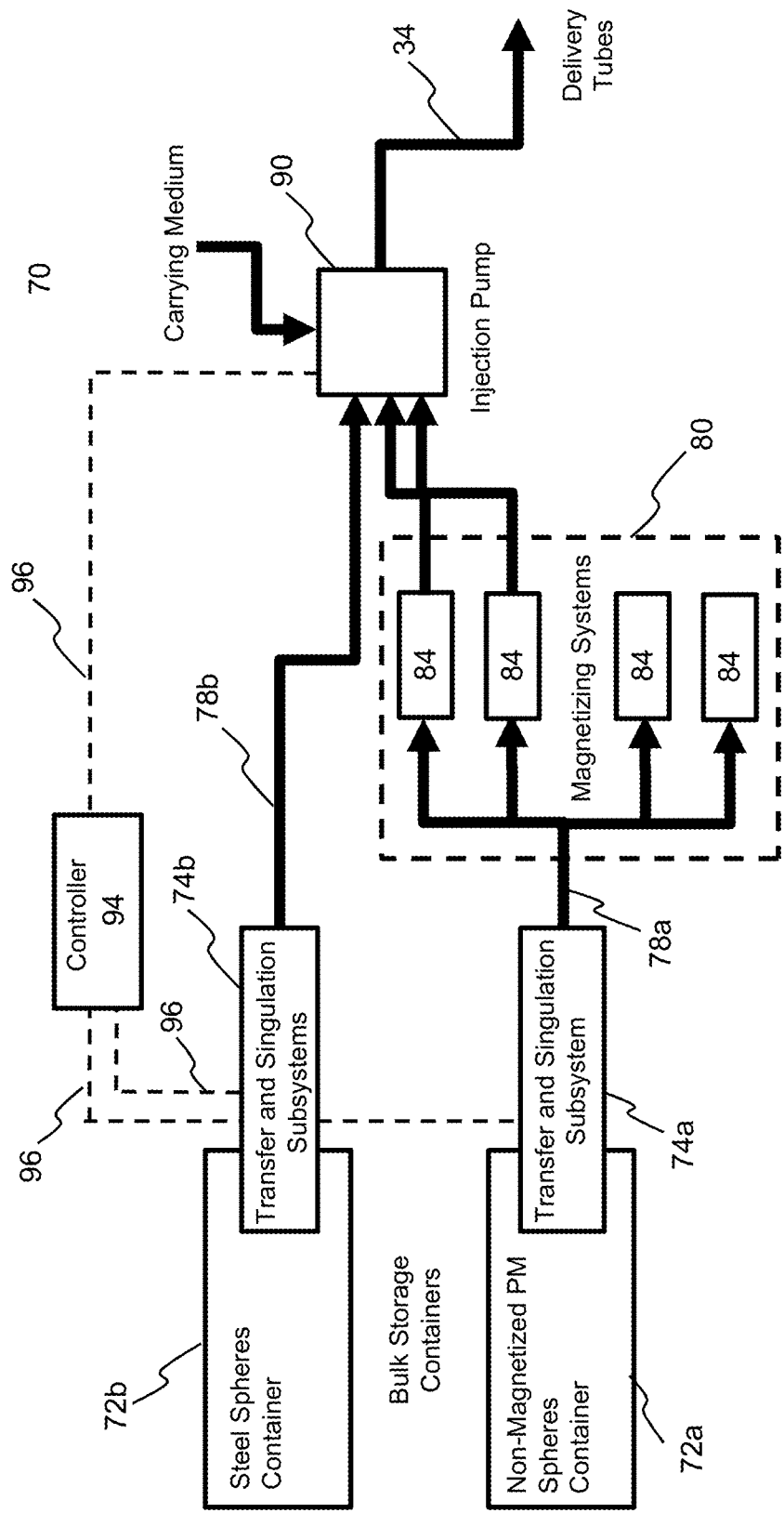
FIG. 4 illustrates a delivery system for dispensing the magnetic particles for repair of the structure shown in FIG. 2.

Before describing in detail the particular methods and an exemplary apparatus relating to the invention, it should be observed that the present invention resides primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the invention. Also, the following embodiments are exemplary constructions which do not define limits as to structural arrangements or methods according to the invention. The embodiments are permissive rather than mandatory and are illustrative rather than exhaustive.

As used herein, the term sea refers to any mass of water, whether flowing or not, in which an uncontrolled flow of fluid may occur. The fluid may include but is not limited to petroleum products. In illustrated embodiments, the flow is directed into the sea but in other embodiments the flow may be a flow of water from the sea through a wall. The term sea bed refers to a floor or ground surface below any mass of water, including a river bed or an ocean floor. As used herein the term magnetic material refers to any material which is or which can be permanently magnetized (i.e., a permanent magnet) made, for example, of neodymium-iron-boron) or a soft iron material which is easily magnetized in the vicinity of permanent magnets, but shows no significant remnant field when removed from the magnetizing field. Soft iron materials are strongly attracted to permanent magnets. As used herein the term magnetized particle includes magnetic particles that have been subjected to a high magnetic field to create a permanent magnetic.

Embodiments of the invention apply to a variety of circumstances where it is desirable to mitigate uncontrolled flow of fluids, e.g., liquids or gases. In some applications the undesired flow may cause environmental damage. In other applications, abatement of the flow may prevent flooding or intrusion of water, particularly in marine structures. In still other applications the flow may be an intrusion into or out of a vessel resulting from structural damage to a wall of the vessel. The following examples pertain to oil spills where the oil emanates from a well head beneath the surface of a body of water. In such embodiments, magnetic materials may be used to mitigate a spill, thereby preventing flow of oil. The flow may result from: (i) a broken pipe extending from below the sea bed; (ii) a ruptured segment of pipe extending above a blowout preventer or, more generally, from a well head, when the blowout preventer cannot be used to control the flow; (iii) a blowout preventer for which a valve cannot be placed in a shut position wherein, for example, flow is mitigated by filling a valve body or opening along an upper portion of the blowout preventer with magnetic material; and (iv) a segment of broken pipe between the well head and a blowout preventer wherein, for example, magnetic material is inserted within the pipe to block passage of fluid through the pipe.

With reference to FIGS. 1A-1F, one embodiment of the invention provides for mitigation of flow through a rupture in a structure 20 by insertion of magnetic materials 10 and 12 into an opening 16 in the structure. The structure 20 may be a segment of ruptured pipe or a portion of a valve or an opening in a blowout preventer. In this example, the opening 16 is shown as having a circular shape corresponding to the opening within an oil pipe, but the invention applies to other openings of arbitrary shape such as those resulting from a rupture in a wall of a pipe line or other vessel. The magnetic material 10, 12 is illustrated as spherically shaped balls of uniform size and the structure 20 is a ferromagnetic soft iron pipe. Prior to insertion into the opening 16, the balls 10 are permanently magnetized. They may, for example, be of a composition comprising neodymium-iron-boron. The balls 12 are of soft iron material, which is only magnetized when in contact with permanent magnets like the balls 10. In this example the illustrated opening 16 is of a diameter corresponding to that of a typical oil well pipe, e.g., 46-50 cm, but principles of the invention apply to openings that are larger or smaller.

FIG. 2 illustrates an embodiment where the structure 20 is a ruptured oil pipeline which may be sealed by an exemplary method now described. The oil pipeline structure 20 is shown having a rupture 22 in a region 26 of the pipeline structure 20. The pipeline structure is a conventional steel tube (e.g., soft iron) of circular shape which has been positioned along a sea bed 28. The rupture 24 has caused flow of oil 24 into the surrounding sea 30. An injection process for sealing the pipeline structure 20 to mitigate the flow of oil through the rupture begins with provision of a flowing carrier medium 32, such as pressurized water. The medium 32 flows through a non-magnetic transport tube 34 and exits the tube through an opening 36 at an end 38 of the tube 34. The tube 34 extends into a bore region 16 within the pipeline structure 20. The bore region of this example corresponds to the opening 16 shown in FIG. 1, defined by an inside diameter of the pipeline structure 20, and is referred to as the bore region 16. With the oil 24 flowing in the direction indicated by arrow 40, the carrier medium 32 exits the tube opening 36 in the bore region 16 at a point of injection 42 and then also flows in the direction indicated by the arrow 40, which direction is parallel with a major axis 46 along a centerline of the pipeline structure 20. In this example, the carrier medium 32 flows with the oil 24 toward the rupture region 26.

In the example of FIGS. 1 and 2, the transport tube enters the bore region 16 through a port 48 formed in the structure 20 upstream of the rupture 24. The portion of the tube 34 which is inserted through the port 48 into the bore region 16 is shown with dashed lines in FIG. 2. The port 48 may be a preconfigured opening in the pipeline segment, or a cavity in a valve body which is accessed by partial disassembly of the valve, or an opening specially created in the pipeline segment 20 after occurrence of the rupture in order to deploy the transport tube upstream of the region 26. In order to mitigate flow of oil through the rupture region 26, permanently magnetized particles 10 and soft iron particles 12 are injected into the bore region 16 in an alternating sequence where one or more magnetized particles 10 are first injected into the bore region 16, and one or more soft iron particles 12 are injected into the opening 16 so that multiple ones of the soft iron particles 12 attach to the one or more particles 10. The sequence of injecting one or more permanently magnetized particles, followed by injecting multiple soft iron particles is repeated to form multiple clusters of particles and reduce the rate of oil flow through the bore region 16.

In an example method in accord with the embodiment of FIGS. 1 and 2, a single first particle 10 is dispensed into the carrier medium 32 for flow through the transport tube 34 to exit through the tube opening 36 and become attached along an inner wall 50 of the pipeline structure 20. The wall 50 of FIG. 2 corresponds to the bore region shown in FIG. 1. Next, multiple ones of the soft iron particles 12 (e.g., a first group of three particles 12) are sequentially dispensed into the medium 32, are carried in a serial flow through the tube 34, and are injected at the point 42 into the bore region 16 where the soft iron particles 12 are attracted to the single permanent magnet particle 10 which has attached to the inner wall 50 of the structure 20. Experiencing the magnetic force of the first particle 10, the particles 12 become attached to the first particle 10 along and adjacent the inner wall 50. As shown in FIGS. 1A and 1G, the one particle 10 and the three particles 12 of the first group form a first magnetized particle cluster 52 along the inner wall 50. The first magnetized cluster is adjacent the point of injection 42.

After the soft iron particles 12 in the first group have been injected into the bore region 16, a single second particle 10 is dispensed into the carrier medium 32 for flow through the transport tube 34 to exit through the tube opening 36 and also become attached along the inner wall 50 of the pipeline structure 20. In this example, the second particle 10 becomes attached to the wall at a position spaced apart from the location of the first cluster 52, but it is also possible for the second particle 10 to attach to the first particle 10 or to a location along the wall adjacent the first particle 10. Next, multiple ones of the soft iron particles 12 (e.g., a second group of three particles 12) are again sequentially dispensed into the medium 32, carried in a serial flow through the tube 34, and injected at the point 42 into the bore region 16 where soft iron particles 12 of the second group experience attractive forces of the first permanently magnetized particle 10 and the second permanently magnetized particle 10. In this example, although the soft iron particles 12 in the second group experience the magnetic forces of both the first and second particles 10, the particles 12 of the second group have become attached to the second particle 10 along and adjacent the inner wall 50. As shown in FIGS. 1B and 1H, the single second permanently magnetized particle 10 and the three soft iron particles 12 of the second group form a second magnetized particle cluster 52 along the inner wall 50. The second cluster is adjacent the point of injection 42.

After the soft iron particles 12 in the second group have been injected into the bore region 16, a single third particle 10 is dispensed into the carrier medium 32 for flow through the transport tube 34 to exit through the tube opening 36 and also become attached along the inner wall 50 of the pipeline structure 20. In this example, the third particle 10 also becomes attached to the wall at a position spaced apart from the locations of the first and second clusters 52, but it is possible for the third second particle 10 to attach to the first particle 10 or to the second particle or to a location along the wall adjacent the first or second clusters 52. Next, multiple ones of the soft iron particles 12 (e.g., a third group of three particles 12) are again sequentially dispensed into the medium 32, carried in a serial flow through the tube 34, and injected at the point 42 into the bore region 16 where the soft iron particles 12 of the third group experience attractive forces of the first permanently magnetized particle 10, the second permanently magnetized particle 10 and the third permanently magnetized particle 10.

In this example, although the soft iron particles 12 in the third group experience the magnetic forces of both the first and second particles 10, the soft iron particles 12 of the second group have become attached to the second particle 10 along and adjacent the inner wall 50. As shown in FIGS. 1C and 1I, the single third particle 10 and the three soft iron particles 12 of the third group form a third magnetized particle cluster 52 along the inner wall 50. The third cluster is adjacent the point of injection 42.

According to the example embodiment of FIGS. 1 and 2, the above-described sequence of injecting one permanently magnetized particle at a time, followed by injecting multiple soft iron particles, is repeated to form additional clusters 52 of particles upstream of the rupture 24 and reduce the rate of oil flow through the bore region 16. See FIGS. 1D and 1J. As the portion of the bore region 16 which receives the clusters 52 becomes filled, the single injection of additional single particles 10 continues with the particles 10 attaching to other particles 10, 12 as well as the inner wall 50. See FIGS. 1E and 1K. As the sequence continues particles 10 and 12 extend across the wall, filling the entire bore region. See FIGS. 1F and 1L.

Other sequences of particle injection are contemplated to fill the bore region. For example, in another method for mitigating flow of fluid through the structure 20, multiple ones of permanently magnetized particles 10 (e.g., a first group of three to ten particles 10) are sequentially placed in the transport tube 34 in spaced apart relation to one another to limit magnetic attraction between the particles 10 such that the particles 10 remain separated from one another prior to injection into the bore region 16, e.g., to avoid clogging the injection tube. Upon entry into the bore region 16, all of the magnetized particles 10 are attracted to the inner wall 50 of the structure 20 or to each other and become magnetically attached to or about the inner wall 50. Next, a first group of the soft iron particles 12 (e.g., comprising at least three times the number of particles 10 which have been injected into the bore region 16) are carried in a serial flow through the transport tube 34 and injected into the bore region 16 where the soft iron particles 12 are attracted to the permanently magnetized particles 10 which are attached to the inner wall 50 of the structure 20. The soft iron particles 12 become magnetically attached to the particles 10 along and adjacent the inner wall 50. The sequence of depositing groups of the particles 10 in the bore region 16, followed by depositing larger groups of the particles 12 in the bore region is repeated until the bore region 16 is filled with particles 10, 12. Numerous other sequences will be apparent.

With a sufficient number of particles 10, 12 filling the aperture region, the flow of oil 24 through the structure 20 becomes severely limited or totally abated. In various embodiments, the sizes of the particles can be varied within or among the groups so that some of the voids which form between larger particles can be filled with smaller particles to further reduce the open volume within the bore region 16 which is available for fluid flow. See, for example, the illustration of FIG. 3 which depicts an agglomeration of the spherically shaped particles 10, 12 of varied size securely attached to one another or to the wall 50 of the structure 20. The diameters of the particles 10, 12 may range, for example, in dimension from more than several centimeters to less than 0.1 mm. Generally, the sizes may range over one to four or more orders of magnitude. As mentioned above the particle size and shape can be matched to the flow rate, since the drag forces on the particles are proportional the flow velocity, the particle cross section and the shape dependent drag coefficient of the particle. The particles 10, 12 should also have a smooth surface to reduce the drag coefficient. Standard rare earth magnets like NdFeB are typically coated with Ni to avoid corrosion and provide a shiny smooth surface.

The rate of oil flow through the structure 20 may be monitored during the process of injecting the groups of particles 10, 12 to observe changes. As the flow level through the structure 20 decreases, determinations can be made to reduce the sizes of the particles 10, 12 in order to further reduce the rate of flow, or to cease injection of particles, or to apply a sealing material as further discussed herein to further abate flow through the structure 20. As the flow is reduced the spherically shaped particles 10, 12 may be replaced with smaller particles or soft iron filings.

In the illustrated embodiments, the permanently magnetized particles 10 are inserted into the transport tube 34 so that they each travel and remain in spaced apart relation to other magnetized particles 10 and soft iron particles 12. The soft iron particles 12 within each group of particles 12 do not have to be dispensed in spaced apart relation to one another since they will not attract one another while flowing in the tube. The particles 12 may be dispensed to travel in parallel or may otherwise be in relatively close proximity to one another.

In other embodiments, once sufficient blockage of fluid flow occurs in the structure, supplemental means may be applied to totally abate fluid flow through the structure 20, including insertion of material that can fill voids between the particles 10, 12 with materials that cure into a solid or relatively stable, e.g., viscous, medium which resists flow through the structure 20. Suitable materials include numerous types of cements, epoxy resins and other polymers.

With reference to FIG. 4, there is illustrated a delivery system 70 suitable for dispensing the afore described particles 10, 12 into the transport tube 34 for injection into a structure 20. In this example, the particles 10, 12 are assumed to be spherically shaped balls. However, other shapes can be accommodated for transport and delivery by the system 70. To facilitate handling, the particles 10 are initially not magnetized and are provided in a container 72a from which the particles 10 are fed into a first transfer and singulation subsystem 74a which includes a pick and place apparatus (not shown) that removes the particles 10 from the container 72 and loads the particles 10 onto a flighted conveyor 78a. The subsystem 74a passes the particles 10 through a magnetizing system 80 which generates a high magnetic field, e.g., 2 Tesla, that permanently magnetizes the particles 10 prior to dispensement of the particles 10 into the carrier medium 32. By traversing the permanent field of the system 80, the particles 10 become permanent magnets. Depending on the power applied and the length of time required to magnetize the particles 10, the throughput of the delivery system 70 can be maximized with utilization of multiple magnetization chambers 84 in the magnetizing system 80. In this example, a plurality of the chambers 84 are formed in a parallel arrangement to each receive a different particle 10. Accordingly, the transfer and singulation subsystem 74a feeds multiple particles 10 individually into different ones of the magnetization chambers 84, then carries the particles 10 through the chambers 84 and, upon exit from the chambers 84, the subsystem 74a merges the magnetized particles 10 into a serial flow in which the particles 10 are spaced apart from one another to prevent attractive magnetic forces from bringing the magnetized particles 10 into contact with one another. With reference also to the embodiment of FIGS. 1 and 2, the particles 10 are then inserted into a non magnetic injection pump 90 of the delivery system 70 while the pump 90 sends the carrier medium 20 into the transport tube such that particles 10 are individually dispensed into the flowing carrier medium and into the transport tube 34 for delivery into the bore region 16 of the structure 20.

The delivery system 70 includes a controller 94 which directs and controls operation of numerous components in the system 70 via control lines 96, including control lines extending to the subsystems 74a, 74b and pump 90. The controller directs the subsystem 74a to provide single ones of the particles 10 to the pump 90 for dispensement into the bore region 16 of the pipeline structure 20. In some configurations of the delivery system 70, the transfer and singulation subsystem 74a separately picks and places the individual particles 10 in a manner which effects spaced apart positioning of the particles 10 prior to entry of the particles 10 into the magnetizing system 80. It is important to point out that the handling and delivery system for the particles 10 has to be non-magnetic to avoid having the particles 10 stick to portions of the material in this system.

The particles 12 consist of inexpensive soft iron material like standard construction steel. I Initial handling of the particles 12 by the delivery system 70 is separate from but similar to handling of the particles 10. The particles 12 are provided in a container 72b from which they are serially fed in groups into a second transfer and singulation subsystem 74b similar to the subsystem 74a. The subsystem 74b removes the particles 12 from the container 72b and loads the particles 12 onto a flighted conveyor 78b.

The transfer and singulation subsystem 74b also operates under direction of the controller 94 to transport groups of particles 12. Soft iron particles 12 in each group are serially fed into the pump 90. Since the particles 12 are not magnetized prior to injection into the pump 90, they need not be in spaced apart relation to one another to prevent the particles 12 from magnetically attaching to one another. However, serially providing the particles 12 to the pump in a spaced apart configuration may facilitate a more uniform distribution of the particles 12 in the opening 16.

The pump 90 is connected to receive the carrier medium 32 from a reservoir (not shown) and generate a high pressure supply suitable for injection into the underwater structure 20. The pump generates sufficient pressure to send the carrier medium and particles 10, 12 to the depth at which the structure is below the surface of the sea 30 and to counter the pressure of oil flow in the structure 20 to inject the particles 10, 12 into the structure 20. The delivery system 70 includes the transport tube 24 positioned to receive the carrier medium and groups comprising particles 10 or particles 12 from the pump 90 for sequential insertion of particles in each group into the point of injection 42 for attachment in the bore region 16 of the structure 20.

The delivery system 70 includes the transport tube 24 which is coupled to receive the magnetized and non-magnetized particles 10, 12 from the pump 90, in accord with an alternating sequence such as has been described herein, for delivery to and insertion within the bore region 16, e.g., through the point of injection 42. As the particles 10 travel away from the pump 90 they remain in spaced apart relation from one another until they become attached to a magnetic body (e.g., the inner wall 54 of the structure 20 or another particle 10, 12).

Generally, the delivery system 70 may be implemented with multiple different technologies and configurations used in volume manufacture, materials handling and packaging, the details of which are well known and need not be described herein.

In the forgoing examples and in other applications of the invention, the term magnetic material refers to a plurality of magnetic particles. The magnetic material may comprise groups of particles 10 and groups of particles 12 intermixed with one another as afore described, but in other embodiments the magnetic material may comprise only permanently magnetized particles or a combination of permanently magnetized material and other nonmagnetic materials. The magnetic material may be of varied form, e.g., a granulate having particles of different sizes. The magnetic material may comprise magnetic beads or powder or a mixture of crushed permanent magnets mixed with iron filings. The magnetic material may comprise particles of irregular shape or of regular geometric shapes with individual particles varying in both size and shape. Particles of the magnetic material may also vary in both composition and magnetic strength. For example, the material may comprise magnetized elements having different field strengths as well as non-magnetized magnetic elements, and the elements may vary in size. The permanent magnetic particles may comprise rare earth elements and may be of the form NdFeB or SmCo. AlNiCo may also be suitable material for the particles 10. The soft iron particles 12 may be conventional construction steel. Depending on the magnetic material a coating might be required to avoid corrosion, in particular when the particles 10 come into contact with sea water. Suitable forms are commercially available.

Figure 5:
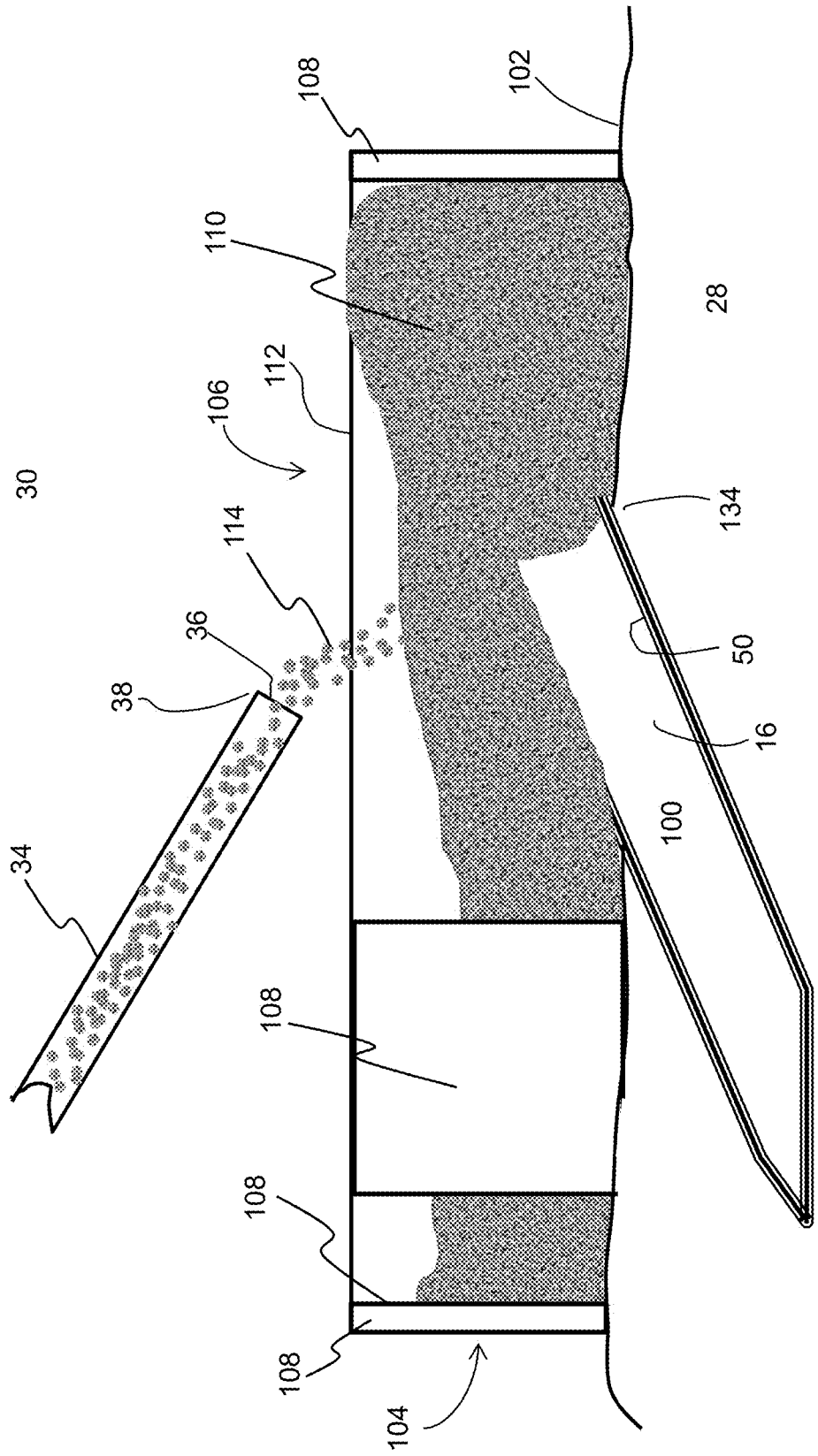
FIG. 5 illustrates a perimeter structure formed about another ruptured structure where a flow of oil is abated with the delivery system of FIG. 5.
Figure 6:
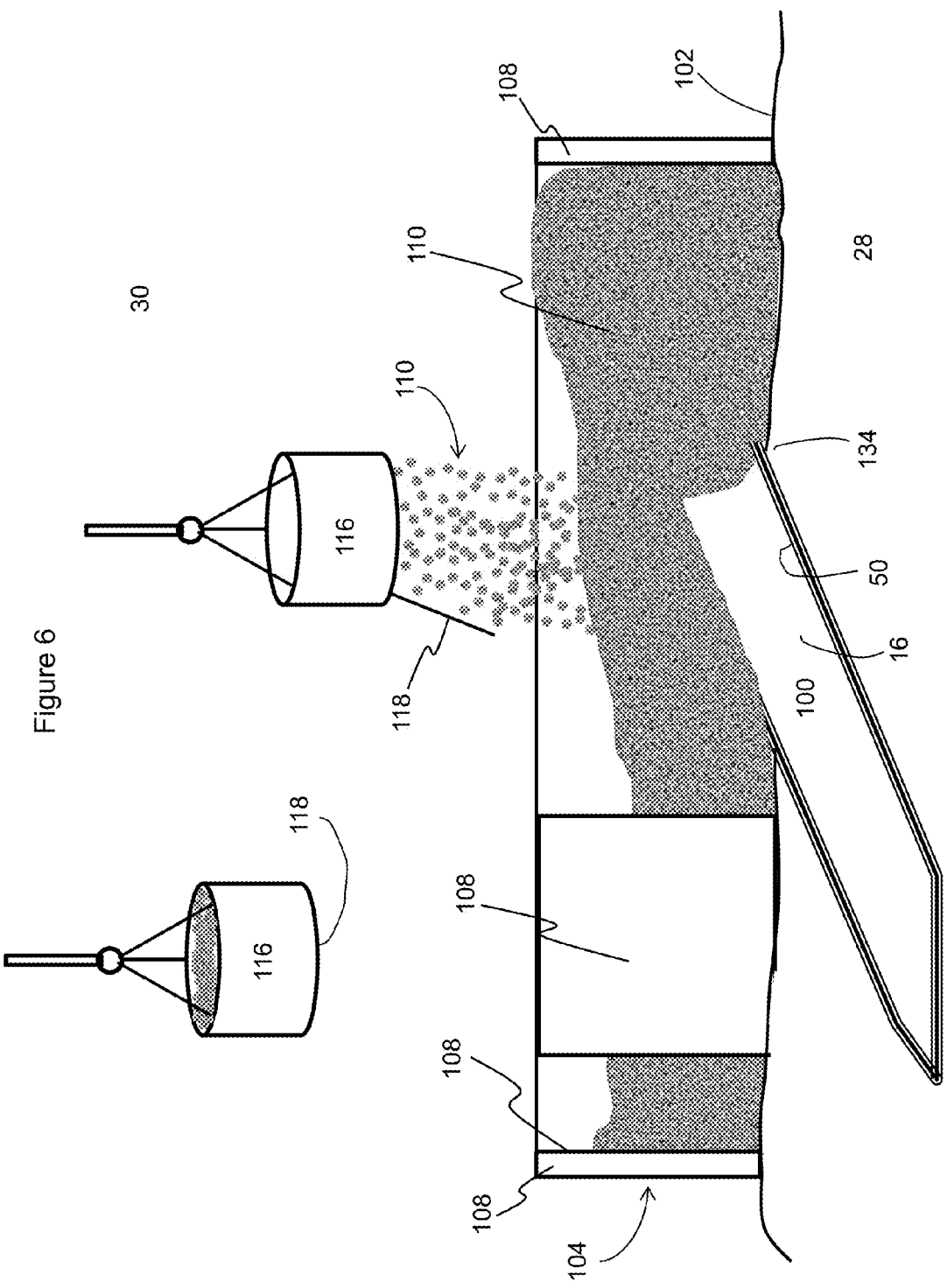
FIG. 6 illustrates mitigation of an uncontrolled flow of oil by lowering magnetic material placed in basket containers over a perimeter structure.

With reference to the schematic illustrations of FIGS. 5 and 6, applications of the invention are shown for a ruptured pipeline 100 extending along the horizontal surface 102 of a seabed 28 wherein a containment or perimeter structure 104 is formed about a region 106 of the pipeline 100 from which a flow of oil emanates due to the rupture. The pipeline 100 illustrated is severed such that the oil 24, which would normally flow through the bore region 16 for collection, instead flows through an open end 134 directly into the surrounding sea 30. In other examples, the pipeline 100 of FIGS. 5 and 6 may have a rupture 26 as shown about the region 26 of FIG. 2.

The structure 104 of FIG. 5 may be a ring or, as illustrated, a series of plates 108 formed of, for example, iron or steel. The plates 108 are vertically positioned with respect to the sea bed surface 102 to define a perimeter within which magnetic material 110 is placed. In this and other embodiments, the ring and the plates 108 are formed of ferromagnetic material, but these components need not be magnetic in order to mitigate flow through the ruptured pipeline 100. For example, the containment structure or the plates 108 may be formed of concrete. In one embodiment, the magnetic material 110 is deposited within the perimeter structure 104 to cover the region 106 or to more broadly cover the portion of the sea bed 28 over which the perimeter structure 104 is formed. Magnetized particles in the magnetic material 110 can attach to the pipeline 100 as well as the perimeter structure 104. In the illustration of FIGS. 5 and 6, portions of the perimeter structure are represented by a horizontal line 112 in order to provide views of the magnetic material 110.

Deposition of the magnetic material 110 to abate oil flow from the ruptured pipeline may be effected with the delivery system 70. As shown in FIG. 5, the opening 36 at the end 38 of the transport tube 34 is positioned above the perimeter structure 104 to deliver a flow 114 of particles 10, 12 or other forms of the magnetic material 110 into the region 106. The end 38 of the tube 34 may be moved about over the perimeter structure to distribute particles of the magnetic material as desired. In one example, the plates 108 are formed of soft iron to form a barrier around region 106 to provide the perimeter containment structure 104. The perimeter structure 104 is then filled with the magnetic material 110 in a manner which covers the path through which the oil is escaping—and thereby significantly reduce the flow rate of escaping oil. It is noted, however, that when the structure 104 is formed of nonmagnetic material, deposition of the magnetic material 110 can nonetheless cover the path through which the oil is escaping. For example, the weight of the magnetic material combined with the ability of the material 110 to form a relatively large, dense mass on the sea bed 28 can render it unnecessary to have the material 110 magnetically attach to the perimeter structure 104. If the perimeter structure 104 is in the form of a ring, the ring can be covered with a dome having a port through which the remaining flow of oil is collected and carried above the surface of the sea 30 through a pipe.

With reference to FIG. 6, the ruptures described with respect to FIG. 5 can be covered according to another embodiment to mitigate an uncontrolled flow of oil 24 from the region 106. In this example, the uncontrolled flow is abated by placing the magnetic material 110 in non-magnetic basket containers 116 and lowering the baskets 116 over the region 106 to drop or otherwise position the magnetic material over the entire perimeter structure 104. When the basket containers 116 are positioned over the perimeter structure 104, the bottoms 118 of the basket containers 116 are opened to release the magnetic material 110. In this example as well as the foregoing illustrations, the material 110 may have a fluid-like characteristic enabling the material 110 to create a shape somewhat conforming with the surface over which it is placed. The process of positioning the magnetic material in the perimeter structure 104 with the basket containers 116 is repeated until the flow of oil is mitigated or eliminated. Once the magnetic material 110 is positioned in place within the perimeter structure 104, a sealing material can be applied over the surface of the deposited magnetic material 110 to further mitigate the flow of oil.

In one series of embodiments, a magnetic material 110 such as a granulate can be injected into an area over the sea bed 28, or lowered in baskets 116 to an area over the sea bed 28, and the area may be surrounded by a containment ring or perimeter structure 104 so that the magnetic material fills at least a portion of the region 106 defined by the structure 104. The magnetic materials attach about a wall 50 of the pipeline and close the bore opening. The magnetic forces are strong enough to hold the individual particles in the magnetic material together despite the high pressure force of oil flowing through the pipeline 100.

Figure 7:
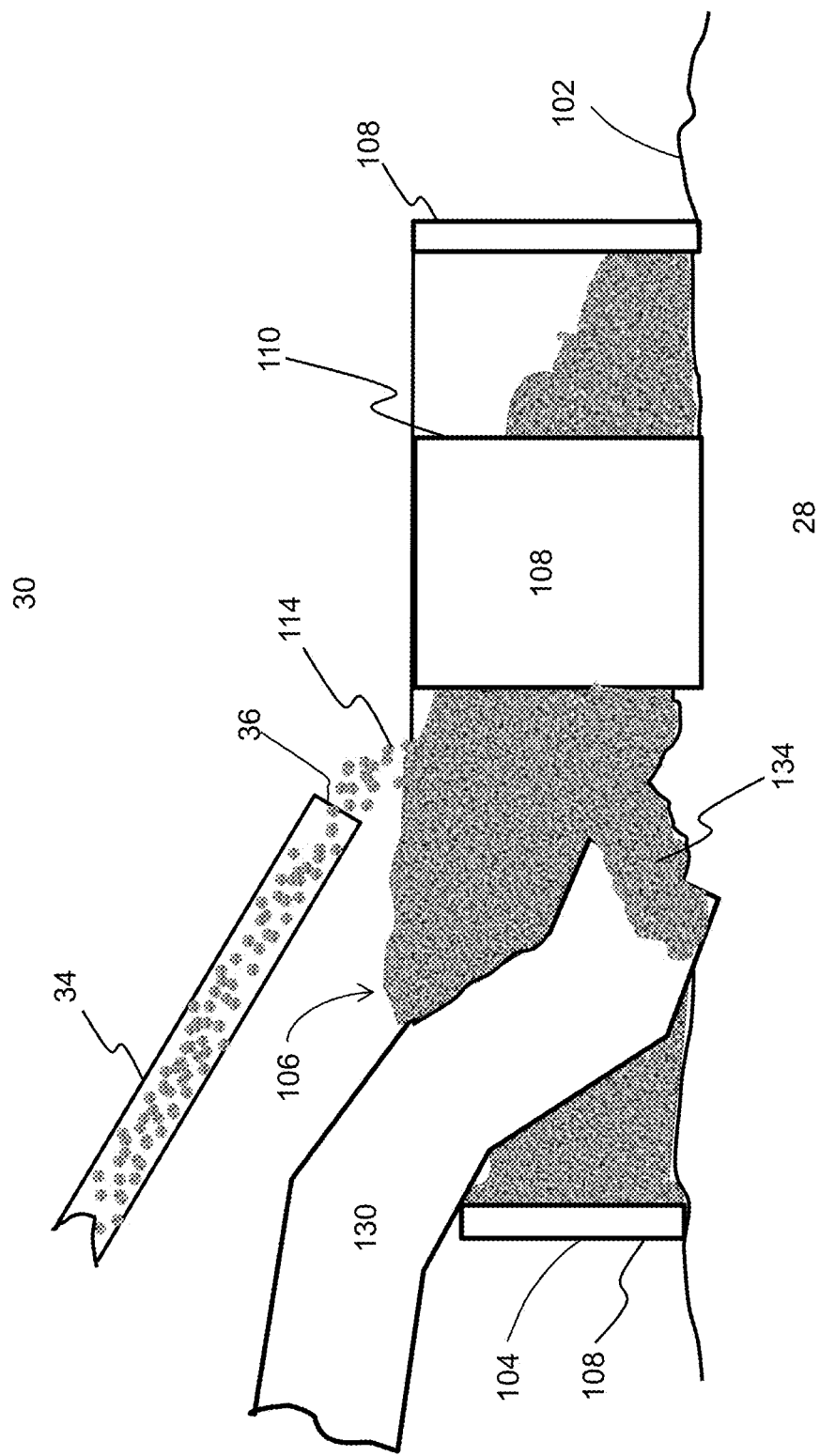
FIG. 7 illustrates a perimeter structure formed about still another ruptured structure where a flow of oil is abated with the delivery system of FIG. 5.

With reference to the schematic illustration of FIG. 7, another application of the invention is illustrated for a severed segment 130 of pipeline extending from a well head (not shown). Prior to breakage, the segment 130 extended upward from the sea bed 28. After being severed, an open end 134 of the segment 130, from which a flow of oil 24 emanates, is positioned along the sea bed surface 102. The open end 134 may have simply fallen toward the sea bed surface 102 under the force of its weight or may have been positioned there in order to seal the flow with the magnetic particles 110. Application of the invention concepts to the arrangement shown in FIG. 7 is substantially the same as described for the applications illustrated in FIGS. 5 and 6 for the ruptured pipeline 100. With the open end 134 positioned along the sea bed surface 102 a containment or perimeter structure 104 is formed about a region 106 of the pipeline segment 130 from which the flow of oil 24 emanates. A perimeter structure 104, illustrated as a series of iron or steel plates 108, is vertically positioned with respect to the sea bed surface 102 to define a perimeter within which the magnetic material 110 is placed. In the illustration of FIG. 7, portions of the perimeter structure are represented by a horizontal line 112 in order to provide a view of the magnetic material 110 which is deposited within the perimeter structure 104 to cover the region 106 or to more broadly cover the portion of the sea bed surface 102 over which the entire perimeter structure 104 is formed.

FIGS. 8A and 8B are schematic views illustrating application of the inventive concepts to mitigate an uncontrolled flow of oil 24 occurring above a blowout preventer 140. The blowout preventer 140 is positioned above a segment 142 of intact pipeline above a well head (not shown). In the embodiment of FIG. 8A a top kill is effected by inserting the end 38 of the transport tube 24 of the delivery system 70 through a valve opening or port 144 near the interface of the blowout preventer 140 and the pipeline segment 142. The transport tube 24 is formed of material which has sufficient flexibility to enable entry through the valve opening 144 and may have a diameter significantly smaller than the diameter of the well pipeline segment 142. Guides (not shown) are positioned on the outside of the transport tube 24 to prevent the permanent magnet material (e.g., the particles 10) from moving the tube 24 to a position against the pipe line wall 142 and clogging up the delivery of the magnetic material 110. The valve opening or port 144 may be part of the blowout preventer or may be positioned in line with the pipeline segment below the blowout preventer. The transport tube 24 is inserted into the bore 148 of the pipeline segment 142 with the opening 36 of the tube 24 positioned to inject the magnetic material 110 into a portion 146 of the bore 148 for attachment along a wall 150 of the pipeline segment. As the flow 114 of the magnetic material 110 continues and the material attaches along the wall 150, the tube end 38 may be moved upward along the bore 148 to distribute the magnetic material 110 over a greater length of the bore 148. A portion 154 of the transport tube, including the portion which is placed through the bore 148 and along the wall 150, is of a flexible design enabling the tube portion 154 to bend and flex as needed in order to be routed through the port 144 and into the pipeline segment 142.

In the embodiment of FIG. 8B the opening 36 of the transport tube 24 of the delivery system 70 is positioned to inject a flow 114 of the magnetic particles 110 through the blowout preventer 140 and into the pipeline segment 142. A portion 146 of the bore 148 of the pipeline segment 142 receives the magnetic material. As the flow 114 of magnetic material continues, the tube 24 is displaced upward along the bore 148 to distribute the magnetic material 110 over a length of the bore. The magnetic material may be the particles 10, 12 and the carrier medium may be water or mud injected into the pipeline segment at a high pressure.

With reference to FIGS. 9A and 9B there is shown a box structure 170 placed about a blowout preventer 140. The box structure is a five sided steel structure having an opening 174 above the blowout preventer through which magnetic material 110 is received into the structure 170. As shown in FIG. 9B, the box structure 170 is filled to a level 176 above the blowout preventer 140, e.g., filled to a level approaching the opening 174, so that the magnetic material 110 covers an opening along or above the top of the blowout preventer. The blowout preventer is shown in dashed lines in both FIGS. 9A and 9B to indicate it is partially or completely obscured during and after the process of filling the box structure 170 with the magnetic material. Once the rate of oil flowing from the blowout preventer is reduced to a relatively small level, the box structure can be completely sealed with the placement of a cover 180 over the opening 174.

A feature of embodiments of the invention is that the magnetic material 110 may be provided as fill for injection into a structure 20 which has a high material density as well as a strong magnetic binding force which bonds or binds constituent particles of the material 110 together, even when the material is immersed within a liquid. This combination of relatively high density and magnetic attraction to the box structure or to the blowout preventer 140 improves the stability of the material, i.e., the ability to hold constituents together, thereby impeding the tendency for the material to be washed away by the forces associated with the oil 24 emanating from the well head. With a chamber of the blowout preventer 140 corresponding to the segment 20 of FIG. 1, when the segment 20 is formed with steel or lined with a ferromagnetic material, the magnetic particles stick to the associated walls and act like a scaling material, i.e., continually precipitating along the wall of the structure 20, thereby filling or closing the opening 16. In other embodiments, the box structure 170 or the structure 20 may be formed of materials that are not magnetic. In such cases, the combination of relatively high density and weight of the magnetic material 110 used to fill the structure 170 and/or the opening 16, and the strong magnetic binding force which bonds or binds constituent particles of the material 110 together, are sufficient to hold the constituents particles, e.g., particles 10, 12, in place within and about the opening 16 and stablilzed the fill formed with the material 110. Consequently, even without the particles in material 110 being held to the structures 20 and 170, the material 110 forms a stable fill that effectively seals the opening 16.

The described invention can be applied to a wide variety of situations where is it desirable to mitigate flows, including spills or containment leaks associated with nuclear reactor disasters. Leaks in a reactor containment vessel, in the cooling system for boiling water reactors (BWRs) and in the storage tanks for spent fuel all pose safety threats when there is potential for release of nuclear radiation into the environment. Some of the leaks can be stopped with the insertion of magnetic material 110 as described above. Due to potential high temperatures near the leak, an appropriate form of the magnetic material 110, perhaps having the highest Curie temperature available, may be chosen, e.g., samarium-cobalt for which $T_{Curie}$>800 C.

FIG. 10 illustrate sealing of an opening in a portion of an exemplary wall structure 200 comprising a ferromagnetic material. The structure 200 may be a portion of a ship hull, a portion of a vertical wall in a containment vessel holding toxic substances or, generally, any wall which provides a barrier between a fluid and another region. The illustrated portion of the structure 200 has an opening 210 formed therein which results in passage of fluid from one side 202 of the structure 200 to another side 204 of the structure 200 and into a region 208. The opening 210 may result from a rupture in the structure 200 due to an explosion, an earthquake or another type of reaction. FIGS. 10A-10F are elevation views of the structure 200 illustrating a sequence showing closing of opening 210 by covering or filling the opening 210 with the magnetic material 110. FIG. 10G is a view of the wall structure 200 and the opening 210 taken along line G-G of FIG. 10A. FIG. 10H is a view of the wall structure 200 and opening 210 shown in FIG. 10G after the opening is covered or filled with the material 110. The material 110 may comprise any of numerous embodiments of the particles 10, 12. However, in the simplified illustration of FIG. 10 the particles 10, 12 are shown as spheres.

Figure 10C:
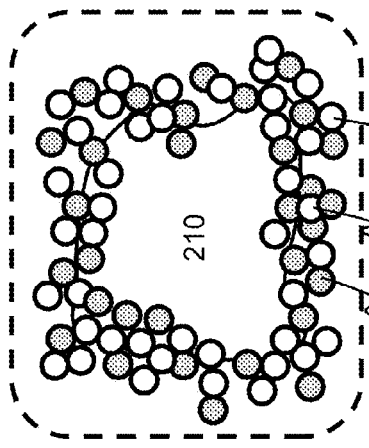
FIGS. 10A-10F are elevation views of a wall structure illustrating a sequence in a process for closing an opening with magnetic material.
Figure 10F:
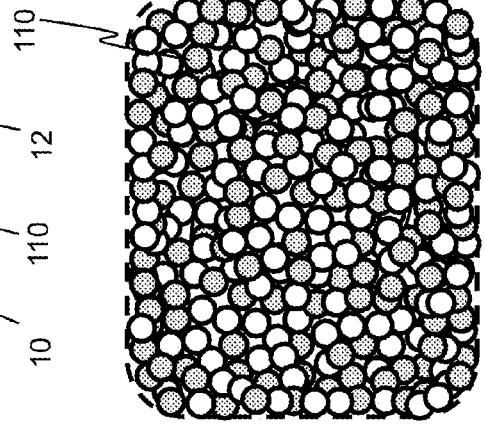
Figure 10B:
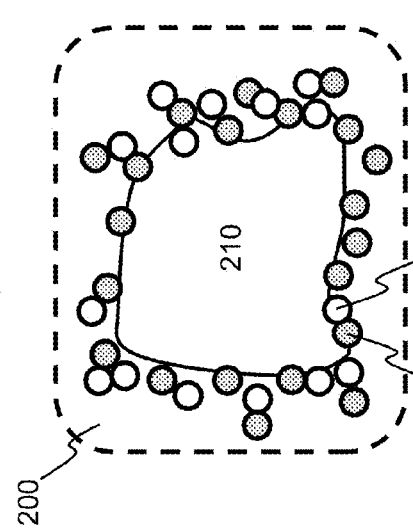
Figure 10E:
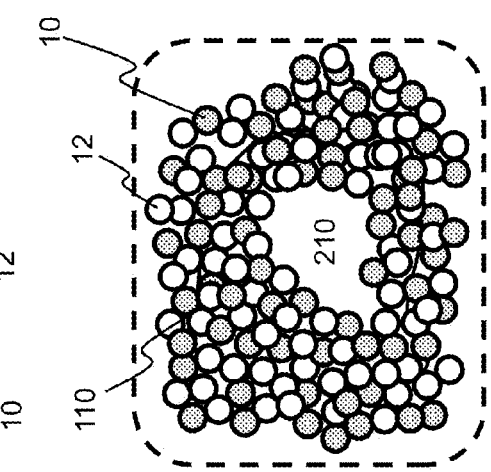
Figure 10A:
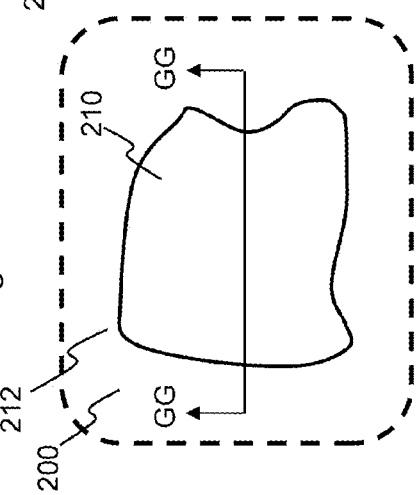
Figure 10D:
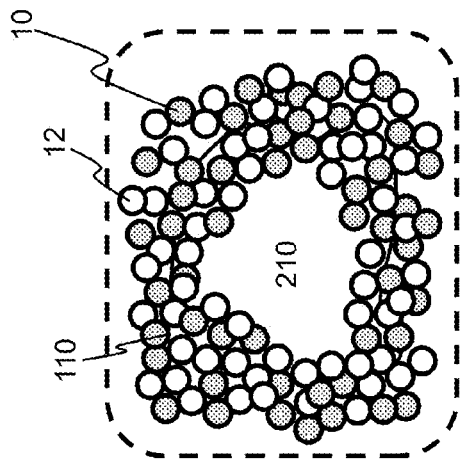
Figure 10G:
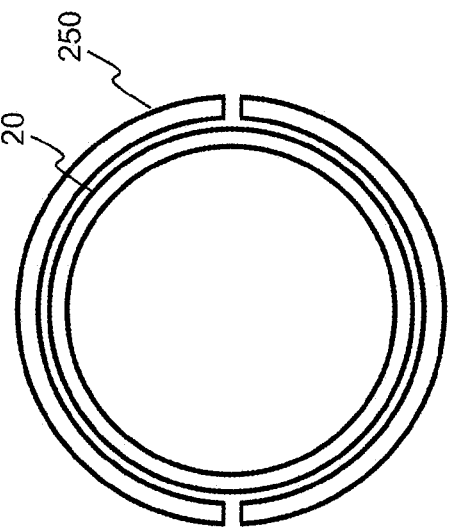

The process for covering or filling the opening 210 may proceed in a manner as described for the structure 20 of FIG. 1, with the understanding that an opening in a wall is being covered or filled in a manner analogous to the filling of a bore region in a pipeline structure. The process may be performed with the system 70 of FIG. 4. As shown in FIG. 10B, the process may begin with attachment of magnetized particles 10 to the wall structure 200 along a perimeter region 212 bounding the opening 210. Further, magnetic particles 12 are attached to the particles 10. The process is repeated. The following sequence is exemplary.

Figure 10H:
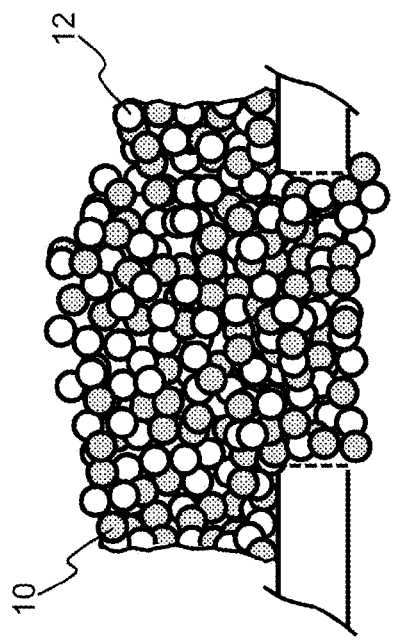
FIG. 10H is a view of the same wall structure and opening shown in FIG. 10G after the opening is covered or filled with the magnetic material.

The open end of the transport tube 34 is placed along the periphery of the opening 210 for movement along the periphery. A pressurized flow of a carrier medium 32 is injected through the tube 34 for transport to the perimeter region 212. With reference to FIG. 10, the magnetized spheres 10 are dispensed into the carrier medium for flow through the tube 34 and placement against the perimeter region 212 on at least one side 202 of the wall structure 200. The ferromagnetic spheres 12 are next dispensed into the carrier medium 32 for flow through the tube 32 and attachment to the previously positioned magnetized balls along the perimeter region 212. The sequence of injecting the spheres 10 and 12 is repeated to attach the magnetic material to previously deposited material 110 as the open end of the tube is moved about and along the opening 210 thereby closing the opening as illustrated in FIGS. 10C-10F. FIG. 10H illustrates the opening after it is completely filled with the magnetic material 110.

Figure 11G:
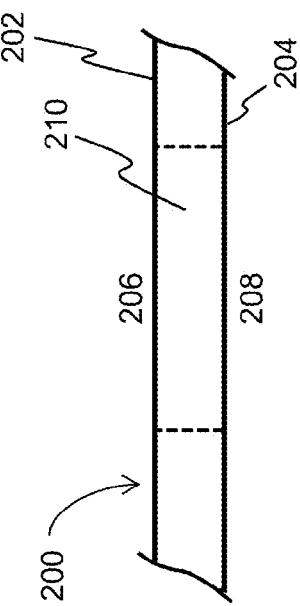
FIG. 11G is a view of the same structure and opening taken along line G-G of FIG. 11A.

FIG. 11 illustrate sealing of the opening 210 in the exemplary wall structure 200 where the structure may also, but does not necessarily, comprise a ferromagnetic material. The embodiment of FIG. 11 is useful when the opening 210 is relatively large (e.g., a square meter or larger) and it is desirable to quickly fill the opening with relatively small particles of magnetic material 110. FIGS. 11A-11F are elevation views of the structure 200 illustrating a sequence showing closing of opening 210 by covering or filling the opening 210 with the magnetic material 110. FIG. 11G is a view of the wall structure 200 and the opening 210 taken along line G-G of FIG. 11A. A view of the wall structure 200 and opening 210 shown in FIG. 10G after the opening is covered or filled with the material 110 is similar to that shown in FIG. 10H. The material 110 may comprise any of numerous embodiments of the particles 10, 12. However, in the simplified illustration of FIG. 11 the particles 10, 12 are shown as spheres. When the wall structure is formed of stainless steel or aluminum or other nonmagnetic material, the magnetized particles 10 cannot be directly applied. To apply the inventive concepts in such contexts, a ferromagnetic frame structure 220, e.g., formed of soft iron, can be welded or otherwise attached, e.g., via a clamping arrangement, to the wall structure 200 about the opening 210. Generally, as shown in the figures, the process for covering or filling the opening 210 shown in FIG. 11 proceeds in a manner as described for the embodiment illustrated in FIG. 10 except that the sequence of injecting the magnetic material 110 is preceded by positioning the frame structure 220 about the opening 210. The illustrated frame structure 220 comprises a series of members (e.g., rods or plates) 224 attached to one another in a pattern that forms a web or ring about the opening 210. As shown in FIG. 11B, the members 224 are configured in the shape of a hexagonal ring having additional members 224 extending across the ring pattern. At various nodes or other positions, permanent magnets 230 are attached to or integrally formed in the frame structure. The opening 210 is covered or filled in a manner similar to that shown in FIG. 10 except that closing of the opening is facilitated by placement of the members 224 and permanent magnets 230 about the opening 210. The process may be performed with the system 70 of FIG. 4. As shown in FIG. 11B, the process may begin with attachment of the frame structure 220 about a perimeter region 212 bounding the opening 210 followed by attachment of the magnetized particles 10 to the frame structure 220. The following sequence is exemplary.

The open end of the transport tube 34 is placed along the periphery of the opening 210 for movement along the periphery. A pressurized flow of a carrier medium 32 is injected through the tube 34 for transport to the perimeter region 212. With reference to FIG. 11, the magnetized spheres 10 are dispensed into the carrier medium for flow through the tube 34 and placement against the frame structure 220 on at least one side 202 of the wall structure 200. The ferromagnetic spheres 12 are next dispensed into the carrier medium 32 for flow through the tube 32 and attachment to the previously positioned magnetized balls or the permanent magnets 230 of the frame structure 220. The sequence of injecting the spheres 10 and 12 is repeated to attach the magnetic material to previously deposited material 110 as the open end of the tube is moved about and along the frame structure 220 thereby closing the opening 210 as illustrated in FIGS. 11C-11F.

Figure 12:
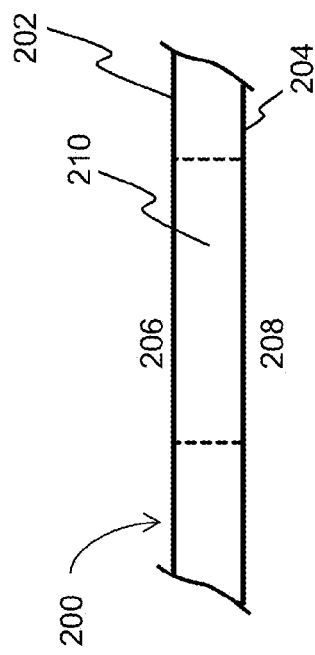
FIG. 12 illustrates an exemplary structure to which the inventive concepts may be applied where the structure is formed of materials which are not magnetic.

FIG. 12 illustrates an exemplary structure 20 which may be formed of materials which are not magnetic. The structure may be a segment of a pipeline, a vessel or other structure along which a rupture or valve failure may occur. In the given example, the structure is shown to be in the form of a tube having an opening 16 therein for flow of a fluid. A ferromagnetic material 250 is shown applied along an outer surface of the structure 20 in order to effect attachment of the magnetic material 110 along the exterior or interior of the structure and close, cover or seal an opening 16 or another opening (e.g., such as a rupture in the structure) to mitigate flow of fluid through the opening. The ferromagnetic material may, as shown, be in the form of a two piece clamping arrangement which fits about the structure 20. Other details relating to installation of the material 250 are not shown.

FIGS. 13A and 13B illustrate an application of the inventive concepts to a structure 300 which normally contains a fluid or is surrounded by a fluid. An opening 304 may be formed in a vertical wall 306 or an opening 308 may be formed along a horizontal surface (e.g., a floor) 310 of the structure 300. The openings may be by design or may result from breakage. The opening 308 is shown to be connected to a component 312 within the structure 300, which component 312 may be a blowout preventer or a valve. Under conditions when there is an undesirable flow in any direction through any such openings, the volume 320 in the region 322 within the structure 300 and adjoining one of the openings 304, 308 may be filled with the magnetic material 110 to seal the opening. The density, weight and magnetic forces associated with particles 10, 12 of the material 110 are sufficient to enable using the material 110 as a filler which builds up over the horizontal surface 310 to prevent flow through one or both of the openings 304, 308. In this example, neither the vertical wall 306 nor the horizontal surface 310 need comprise magnetic material. That is, the properties of the magnetic material 110 are sufficient to provide a stable filling material in the presence of any forces due, for example, to an uncontrolled flow of fluid adjacent one of the openings 304, 308. An uncontrolled flow of oil 24 flowing through a nonmagnetic pipeline is exemplary of such a situation. FIG. 13A illustrates the structure 300 during a process of filling the volume 320 in the region 322 with the magnetic material 110. FIG. 13B illustrates the structure 300 after filling the volume 320 in the region 322 with the magnetic material 110 to seal the openings.

While various embodiments of the present invention have been described, such embodiments are provided by way of example only. Numerous variations, changes and substitutions may be made without departing from the invention herein. By way of example, the principles disclosed can be readily applied to mitigate flows of liquids and gases through a variety of ruptured walls, including the walls of sea-going vessels and containment walls. Further, although the illustrated examples have described the use of a containment structure in combination with particles in certain size ranges to seal a bore region within a pipe, other applications employ plates that may be magnetically bonded to a vessel wall with intermediary use of magnetized particles. By way of example, the delivery system 70 may be used to place magnetized particles along the periphery of a ruptured region such that a plate may be placed against the wall with the intermediate particles 10 providing magnetic forces which securely attach the plate to the wall.

Accordingly, it is intended that the invention be limited only by the spirit and scope of the appended claims.

The claimed invention is:

1. A segment of a structure modified to mitigate a flow of a fluid therethrough, the segment including an opening for the fluid flow, the modified structure comprising:
a ferromagnetic wall defining the opening;
a first plurality of permanently magnetized particles; and
a second plurality of magnetic particles, wherein
some of the first plurality of permanently magnetized particles are attached to the wall by magnetic forces and
some of the magnetic particles of the second plurality are attached to the first plurality of permanently magnetized particles.

2. The segment of structure of claim 1 wherein the second plurality of magnetic particles are ferromagnetic particles attached to other ferromagnetic particles by magnetic forces.

3. The segment of structure of claim 1 wherein the second plurality of magnetic particles includes particles each attached to another magnetic particle.

4. The segment of structure of claim 1 wherein the combination of the first and second pluralities of particles form a cluster which extends across the opening to limit flow of the fluid.

5. The segment of structure of claim 1 wherein in extending across the opening the first and second pluralities of particles fill the opening.

6. The segment of structure of claim 1 wherein the second plurality of magnetic particles are ferromagnetic particles.

7. The segment of structure of claim 1 wherein the first plurality of permanently magnetized particles include particles having the shape of spherical balls.

8. The segment of structure of claim 1 wherein each in the first plurality of permanently magnetized particles have the shape of spherical balls.

9. The segment of structure of claim 1 wherein the second plurality of magnetic particles include particles having the shape of spherical balls of varied sizes.

10. The segment of structure of claim 1 wherein the second plurality of magnetic particles include particles having varied sizes.

11. A system for injecting magnetic particles into a cavity to impede movement of fluid through the cavity, comprising:
a transport tube having a major portion formed of non-magnetic material and having first and second opposing ends for receiving or emitting a carrier medium under pressure into the transport tube; and
a pump coupled to receive the carrier medium and transfer the carrier medium under pressure into the transport tube;
control circuitry; and
components configured to separately select particles of different types, wherein the components operate under direction of the control circuitry to control the separate selection of the particles of different types and separately inject particles of different types into the transport tube in an alternating sequence according to the type of particle for passage of particles of at least two different types through the transport tube along with the carrier medium and for exit of the particles from the transport tube in accord with the alternating sequence.

12. The system of claim 11 configured to handle permanently magnetized particles and ferromagnetic particles as two different types of particles for injection into the carrier medium such that injection of each permanently magnetized particle into the transport tube occurs in spaced apart relation with respect to each other permanently magnetized particle so that the permanently magnetized particles do not come into physical contact with one another while in the transport tube.

13. The system of claim 12 configured to handle the permanently magnetized particles and the ferromagnetic particles for injection into the carrier medium such that injection of each permanently magnetized particle into the transport tube occurs in spaced apart relation with respect to each ferromagnetic particle so that the permanently magnetized particles do not come into physical contact with ferromagnetic particles while in the transport tube.

14. The system of claim 13 configured to handle the permanently magnetized particles and the ferromagnetic particles for injection into the carrier medium such that injection of ferromagnetic particles into the pump occurs in spaced apart relation with respect to each of the permanently magnetized particles so that groups of the ferromagnetic particles travel through the transport tube without coming into physical contact with any of the permanently magnetized particles while in the transport tube.

15. The system of claim 14 wherein the components configured to separately select particles of different types include:
a first subsystem for acquiring a first group of magnetic particles and injecting particles from the first group into the transport tube in spaced apart relation to one another; and
a second subsystem for acquiring a second group of magnetic particles and injecting particles from the second group into the transport tube,
wherein the control circuitry comprises an electronic controller having control lines by which the controller directs operation of the first and second subsystems to inject one or more magnetic particles of the first group and one or more particles of the second group into the transport tube in an alternating sequence.

16. The system of claim 15 wherein the permanently magnetized particles and ferromagnetic particles are injected into the pump in accord with the alternating sequence prior to passage through the transport tube.

17. The system of claim 11 wherein the permanently magnetized particles and ferromagnetic particles are injected into the pump in accord with the alternating sequence prior to passage through the transport tube.

18. The system of claim 12 wherein the components comprise a magnetizing system which generates a sufficiently high magnetic field to provide the permanently magnetized particles by permanently magnetizing one of the types of selected particles prior to injection of said one type of selected particle into the transport tube.

19. A method of mitigating a flow of fluid through a cavity having a bore region in a structure about which there is positioned ferromagnetic material along which the fluid flows comprising:
attaching a first plurality of magnetic particles to the ferromagnetic material and to one another;
attaching a second plurality of particles to particles in the first plurality to fill a portion of the core region with magnetic particles which impede the fluid flow.

20. The method of claim 19 wherein the ferromagnetic material is formed as a wall surrounding the cavity.

21. The method of claim 19 wherein the cavity is a bore region in a pipe.

22. The method of claim 19 wherein the cavity of part of a valve.

23. The method of claim 19 wherein the cavity is filled with the magnetic particles to reduce the fluid flow.

24. The method of claim 19 further including sending particles of the first and second pluralities through a non-magnetic transport tube having an end positioned to dispense particles sent through the tube into the cavity.

* * * * *